US008294598B2

(12) United States Patent
Ozaki et al.

(10) Patent No.: US 8,294,598 B2
(45) Date of Patent: Oct. 23, 2012

(54) ELECTRONIC APPARATUS AND ELECTRONIC SYSTEM

(75) Inventors: Yukisuke Ozaki, Kobe (JP); Daisuke Baba, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 513 days.

(21) Appl. No.: 12/451,777

(22) PCT Filed: Apr. 30, 2008

(86) PCT No.: PCT/JP2008/058284
§ 371 (c)(1),
(2), (4) Date: Nov. 30, 2009

(87) PCT Pub. No.: WO2008/146567
PCT Pub. Date: Dec. 4, 2008

(65) Prior Publication Data
US 2010/0134326 A1    Jun. 3, 2010

(30) Foreign Application Priority Data
May 31, 2007  (JP) .................... 2007-146296

(51) Int. Cl.
G08B 1/08 (2006.01)
G08G 1/123 (2006.01)
G08C 21/00 (2006.01)
(52) U.S. Cl. ............. 340/995.13; 340/905; 340/539.13; 701/414; 701/444; 701/469; 701/473; 701/526
(58) Field of Classification Search ............. 340/995.13, 340/905, 539.13; 701/414, 444, 469, 473, 701/526
See application file for complete search history.

(56) References Cited

U.S. PATENT DOCUMENTS

| | | | |
|---|---|---|---|
| 5,917,435 A | 6/1999 | Kamiya et al. | |
| 6,130,727 A | 10/2000 | Toyozumi | |
| 2003/0208314 A1 | 11/2003 | Funk et al. | |
| 2004/0204840 A1 | 10/2004 | Hashima et al. | |
| 2006/0121868 A1* | 6/2006 | Jutori | 455/238.1 |
| 2006/0212213 A1* | 9/2006 | Piekarz | 701/200 |
| 2009/0058679 A1* | 3/2009 | Lauterbach et al. | 340/905 |

FOREIGN PATENT DOCUMENTS

| | | |
|---|---|---|
| JP | A-8-318792 | 12/1996 |
| JP | A-11-180222 | 7/1999 |
| JP | A-11-345217 | 12/1999 |

(Continued)

OTHER PUBLICATIONS

International Search Report issued in International Application No. PCT/JP2008/058284; Mailed Jun. 10, 2008.

Primary Examiner — Jennifer Mehmood
Assistant Examiner — Andrew Bee
(74) Attorney, Agent, or Firm — Oliff & Berridge, PLC

(57) ABSTRACT

The present invention is an electronic apparatus 100, from which a portable apparatus 10 is detachable, and which includes an information providing portion 200 for providing information to the portable apparatus 10, the electronic apparatus 100 including: a controller 140 which transmits to and receives from the portable apparatus 10 control information through a first communication line L1, and which controls restarting of the information providing portion 200 when the controller 140 receives from the portable apparatus 10 a signal indicating that a function of the information providing portion 200 stops.

8 Claims, 12 Drawing Sheets

FOREIGN PATENT DOCUMENTS

| | | |
|---|---|---|
| JP | A-2001-239895 | 9/2001 |
| JP | A-2002-181555 | 6/2002 |
| JP | A-2002-328026 | 11/2002 |
| JP | A-2003-166848 | 6/2003 |
| JP | A-2003-235152 | 8/2003 |
| JP | A-2005-524570 | 8/2005 |
| JP | A-2006-301952 | 11/2006 |

* cited by examiner

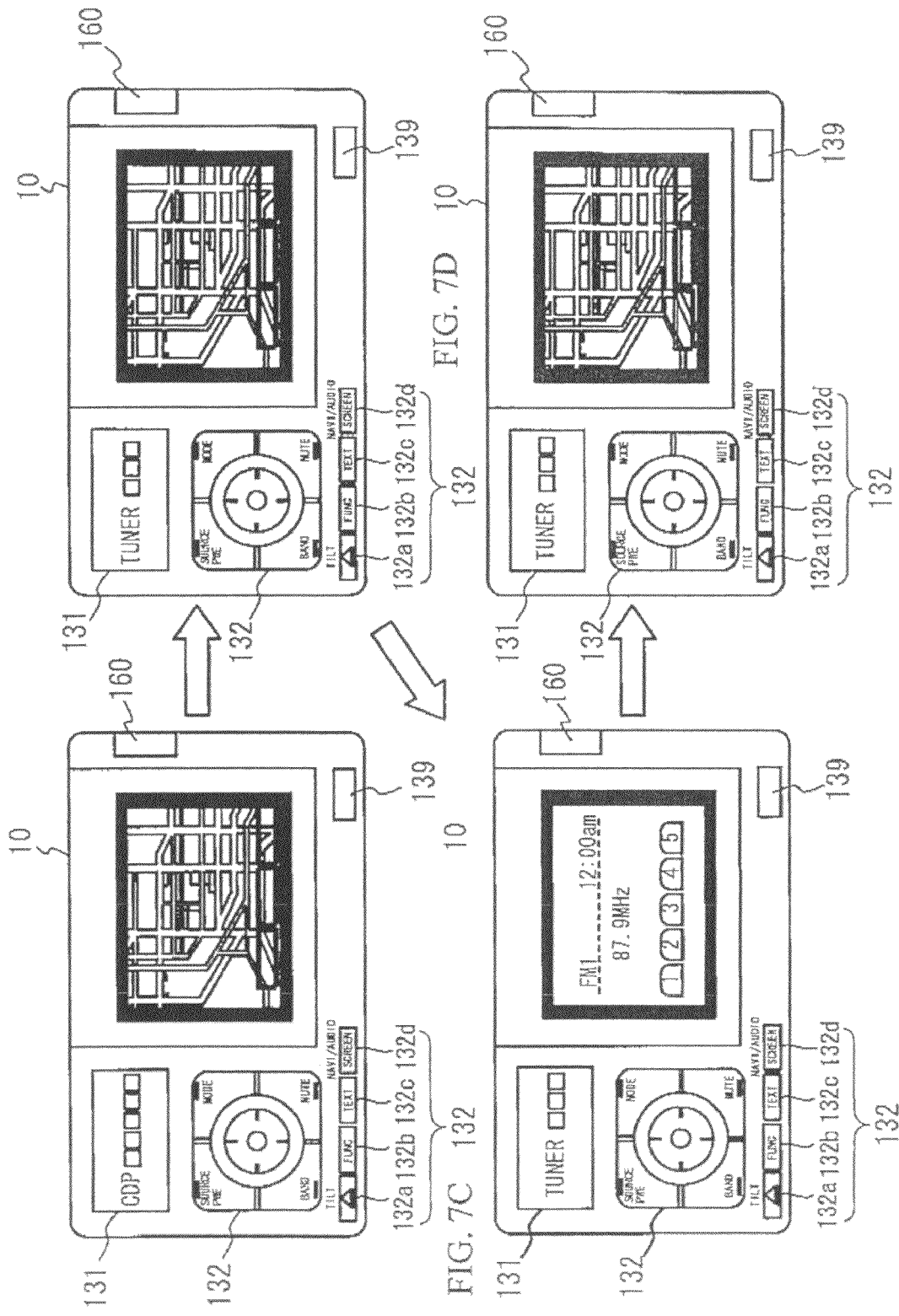

ELECTRONIC APPARATUS AND ELECTRONIC SYSTEM

TECHNICAL FIELD

This invention relates to electronic apparatuses and electronic systems, more particular, to an electronic apparatus to which a portable apparatus is attached and an electronic system.

BACKGROUND ART

As conventional navigation apparatuses, there are widely known small-sized portable navigation apparatuses with a simplified structure and portability (hereinafter, referred to as Portable Navi), also known as Personal Navigation Device; and in-vehicle navigation apparatuses accommodated and fixed in a recess portion (DIN opening) formed in a dashboard of a vehicle. The in-vehicle navigation apparatuses are capable of guiding with high accuracy by use of the information supplied from vehicles such as vehicle speeds, and some of the in-vehicle navigation apparatuses are equipped with audio devices.

In recent years, the navigation apparatuses with portability of the Portable Navi and high-accuracy guide function of the in-vehicle navigation apparatus have been studied.

Patent Documents 1 and 2 disclose a configuration where a CD unit can be detached from an in-vehicle apparatus. Patent Documents 3 and 4 disclose a configuration where a navigation portion can be detached from an in-vehicle apparatus mounted in a vehicle. By removing the navigation portion from the in-vehicle apparatus, the navigation portion can be used as a Portable Navi of a single unit. Also, as disclosed in patent Document 5, the navigation apparatus is taken out of the vehicle and can be used while walking. In addition, when mounted in a vehicle, the navigation apparatus is in a car-navigation mode, and when taken out of the vehicle, the navigation apparatus is in a person-navigation mode.

In the attachment of the navigation portion into the in-vehicle apparatus, for example, the navigation portion is inserted and fitted into a recess portion provided at a front face of the in-vehicle apparatus.

Patent Document 1: Japanese Patent Application Publication No. 8-318792
Patent Document 2: Japanese Patent Application Publication No. 2002-328026
Patent Document 3: Japanese Patent Application Publication No. 2005-524570
Patent Document 4: Japanese Patent Application Publication No. 2001-239895
Patent Document 5: Japanese Patent Application Publication No. 2003-166848

DISCLOSURE OF THE INVENTION

Problems to be Solved by the Invention

The navigation portion and the in-vehicle apparatus are electrically connected through a connector. This limits the number of communication lines connected between the navigation portion and the in-vehicle apparatus, whereby a large number of communication lines is not used. For example, the navigation portion may use a unit, such as an RDS-TMC (Radio Data System-Traffic Message Channel), which provides the navigation portion with traffic information. When the RDS-TMC portion is provided in the in-vehicle apparatus, information is provided to a controller of the navigation portion through the communication line by way of the connector. For example, when the function of the RDS-TMC portion is stopped (hereinafter referred to as freeze), a power of the RDS-TMC portion is restarted. However, the controller determines whether the RDS-TMC portion freezes. Another communication line has to be provided so that the controller of the navigation portion can restart the RDS-TMC portion. Thus, in a case where an information providing portion (such as the RDS-TMC portion), which provides information to a portable apparatus such as a portable apparatus 10, freezes, there is a problem that a communication line has to be further added in order to restart the information, The present invention has been made in view of the above circumstances and has an object to be able to restart an information providing portion that provides information to a portable apparatus without adding a communication line.

Means for Solving the Problems

According to an aspect of the present invention, there is provided an electronic apparatus, from which a portable apparatus is detachable, and which includes an information providing portion for providing information to the portable apparatus, the electronic apparatus characterized by including: a controller which transmits to and receives from the portable apparatus control information through a first communication line, and which controls restarting of the information providing portion when the controller receives from the portable apparatus a signal indicating that a function of the information providing portion stops. According to the present invention, information providing portion can be restarted by using the first communication line for transmitting and receiving the control information. Therefore, the number of the communication lines can be reduced. Further, the number of the communication lines can be reduced and the information providing portion can be restated, thereby reducing the number of the parts and the cost.

According to another aspect of the present invention, there is provided an electronic apparatus, from which a portable apparatus is detachable, and which includes an information providing portion for providing information to the portable apparatus through a second communication line, the electronic apparatus characterized by including: a controller which transmits to and receives from the portable apparatus control information through a first communication line separate from the second communication line, and which controls restarting of the information providing portion when the controller receives from the portable apparatus a signal indicating that a function of the information providing portion stops. According to the present invention, the information providing portion can be started by using the first communication line separate from the second communication line. Therefore, the number of the communication lines can be reduced. Further, the number of the communication lines can be reduced and the information providing portion can be restated, thereby reducing the number of the parts and the cost.

In the above configuration, the controller may control restarting of the information providing portion by turning off power supplied to the information providing portion from a power supplying portion and by turning on the power again when the controller receives from the portable apparatus the signal indicating that the function of the information providing portion stops.

In the above configuration, a power switch which turns off power supplied to the information providing portion from the power supplying portion may be included, the controller may control the power switch when the controller receives from the apparatus the signal indicating that the function of the information providing portion stops, the power switch may turn off power supplied to the information providing portion from the power supplying portion based on control of the controller and may supply the power again.

In the above configuration, the portable apparatus may be a navigation apparatus; and the information providing portion may provide traffic information to the portable apparatus.

According to another aspect of the present invention, there is provided an electronic system including a portable apparatus and an electronic apparatus from which the portable apparatus is detachable and which includes an information providing portion for providing information to the portable apparatus, the electronic system characterized in that: the electronic apparatus includes a controller which transmits to and receives from the portable apparatus control information through a first communication line, and which controls restarting of the information providing portion when the controller receives from the portable apparatus a signal indicating that a function of the information providing portion stops.

According to another aspect of the present invention, there is provided an electronic system including a portable apparatus and an electronic apparatus from which the portable apparatus is detachable and which includes an information providing portion for providing information to the portable apparatus through a second communication line, the electronic system characterized in that: the electronic apparatus includes a controller which transmits to and receives from the portable apparatus control information through a first communication line separate from the second communication line, and which controls restarting of the information providing portion when the controller receives from the portable apparatus a signal indicating that a function of the information providing portion stops.

Effects of the Invention

According to the present invention, an information providing portion can be restated by using a first communication line for transmitting and receiving control information. Therefore, the number of the communication lines can be reduced. Further, the number of the communication lines can be reduced and the information providing portion can be restated, thereby reducing the number of the parts and the cost.

BRIEF DESCRIPTION OF THE DRAWINGS

FIGS. 7A to 7D are schematic views of a display of the portable apparatus attached to the main body;

BEST MODE FOR CARRYING OUT THE INVENTION

In the following, a description will be given of an embodiment with reference to the drawings.

First Embodiment

Figure 1A:
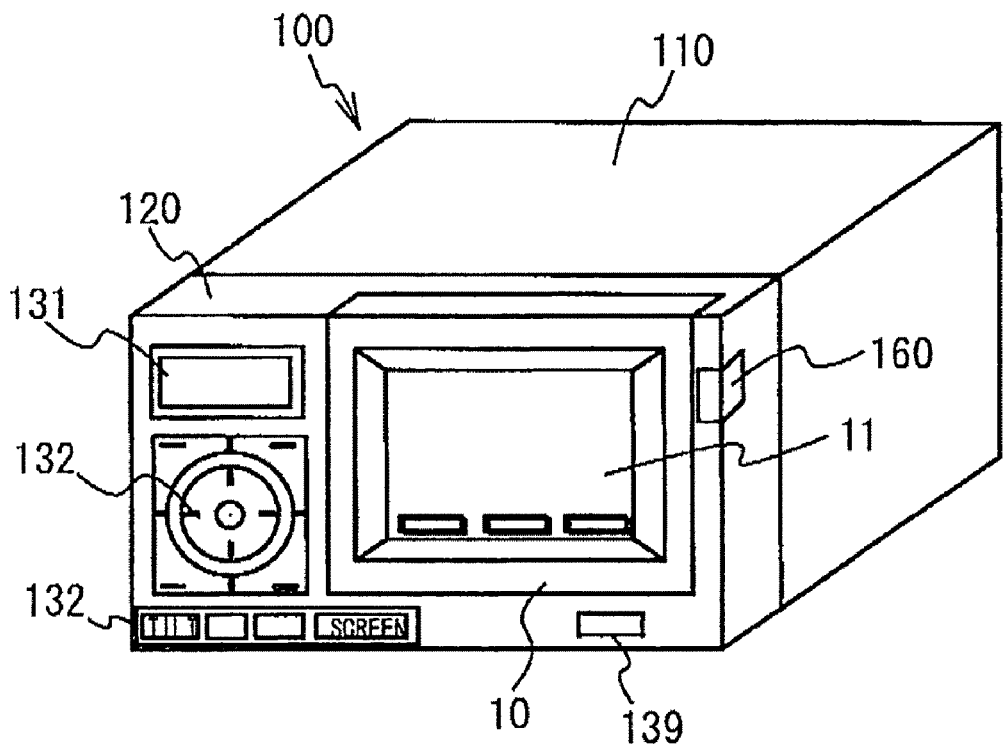
FIG. 1A and FIG. 1B are schematic views of exterior views of an in-vehicle system employed in a first embodiment.
Figure 1B:
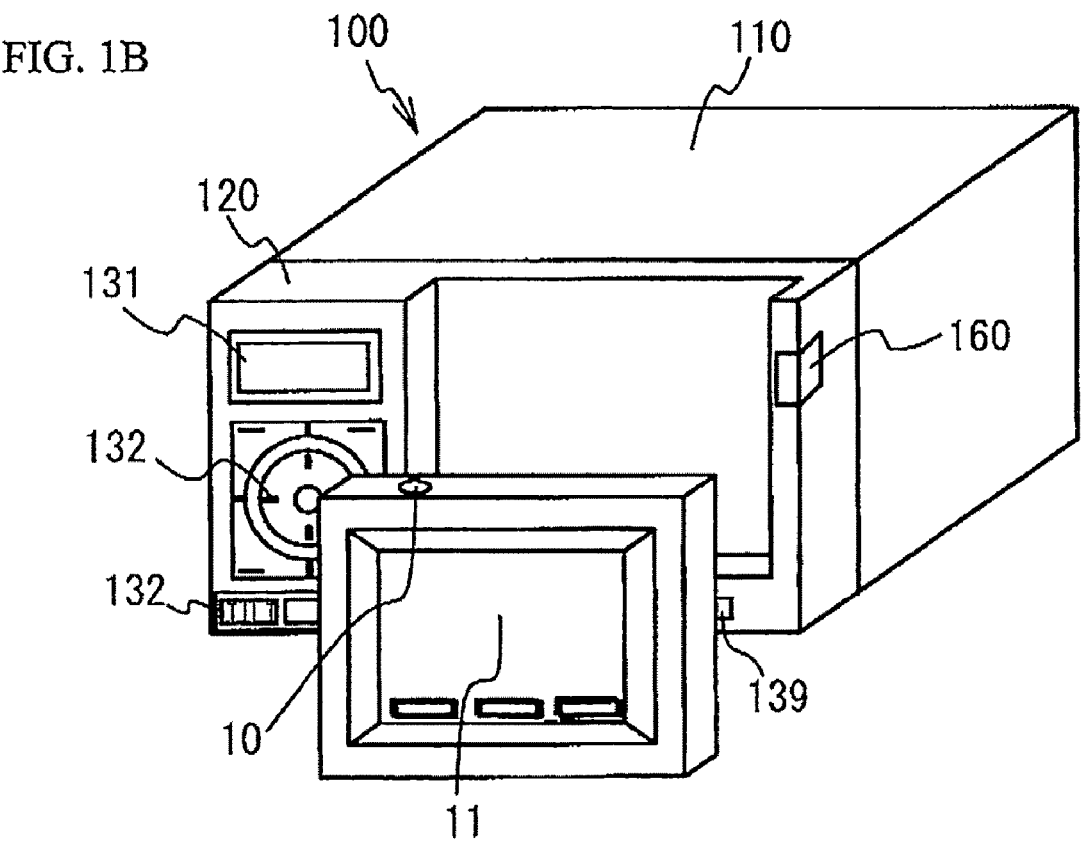

FIGS. 1A and 1B show exterior views of an in-vehicle system 1, as an example of an electronic system. As shown in FIGS. 1A and 1B, the in-vehicle system 1 is composed of: an in-vehicle apparatus 100 (in-vehicle electronic apparatus); and a portable apparatus 10 (portable navigation apparatus) with navigation capabilities. The portable apparatus 10 can be used after being attached at a front face portion 120 of the in-vehicle apparatus 100, as shown in FIG. 1A, and can also be used after being detached from the in-vehicle apparatus 100, as shown in FIG. 1B. In this manner, the portable apparatus 10 is detachable from the in-vehicle apparatus 100, and the portable apparatus 10 is attachable to the in-vehicle apparatus 100.

The in-vehicle apparatus 100 is capable of playing radio broadcasting or playing music data recorded on a memory medium such as a CD (Compact Disc) or the like, and the in-vehicle apparatus 100 includes: an in-vehicle apparatus main body 110 having a CD player and a CD insertion/ejection slot; and the front face portion 120 having a display portion 131 and an operating portion (main operating portion) 132. The portable apparatus 10 has navigation capabilities of searching for a guiding path to a destination and displaying the searched guiding path over a map.

Figure 2:
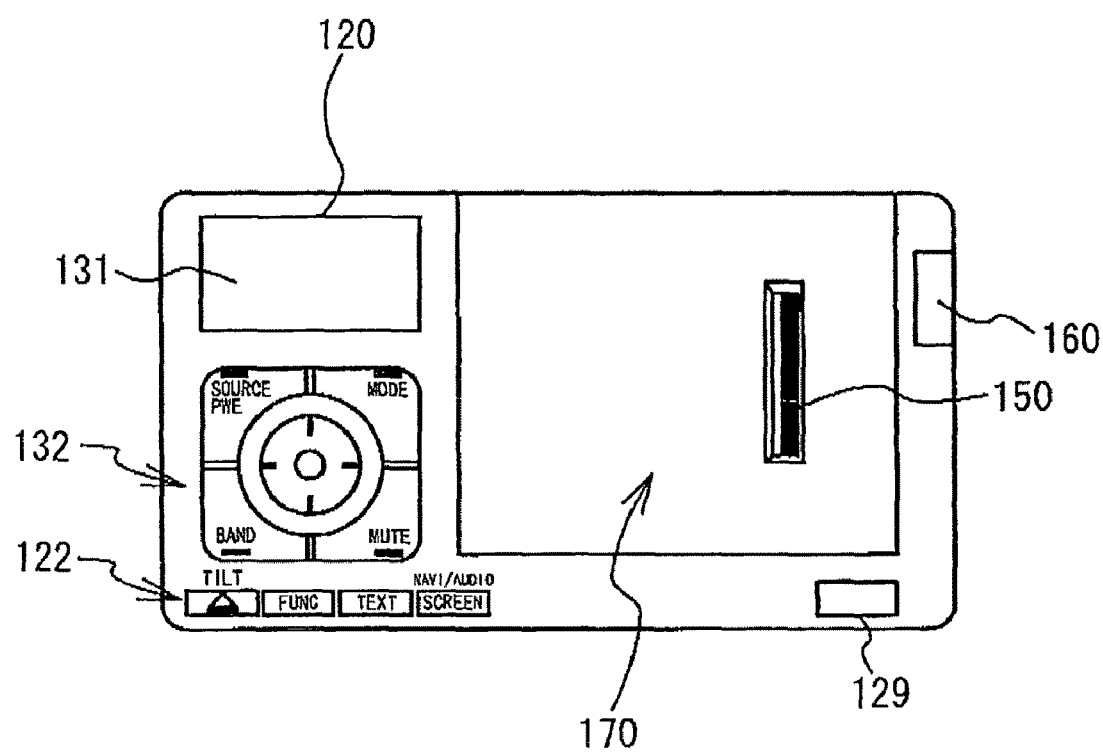
FIG. 2 is a schematic view of an in-vehicle apparatus, from which the portable apparatus is removed.

FIG. 2 shows the front face portion 120 of the in-vehicle apparatus 100, from which the portable apparatus 10 is removed. There is provided an attached/detached portion 170 in which a recess portion is defined for attaching the portable apparatus 10, at the front face portion 120 of the in-vehicle apparatus 100. The attached/detached portion 170 is provided with: a connector 150 (housing portion side connector) for electrically coupling the in-vehicle apparatus 100 and the portable apparatus 10; and a lock mechanism (not shown) for securing the portable apparatus 10 to the front face portion 120. When a detach button 160 provided at the front face portion 120 is operated, a lock mechanism, not shown, is unlocked and the portable apparatus 10 is detachable from the in-vehicle apparatus 100.

Figure 3:
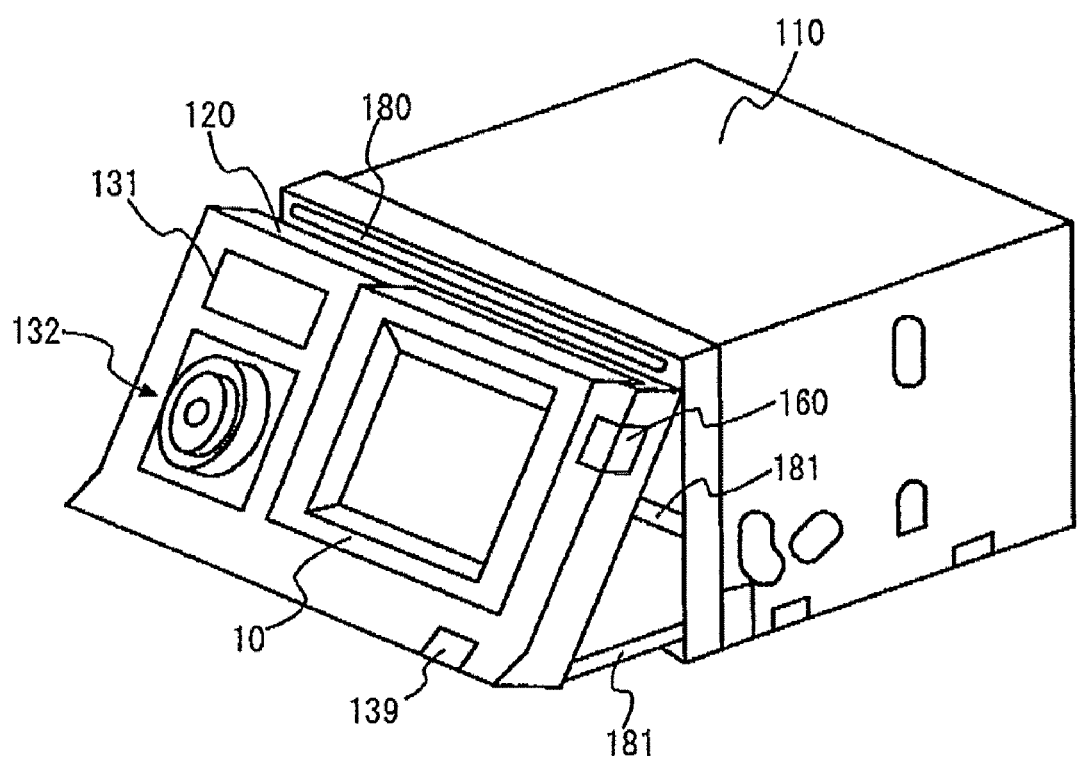
FIG. 3 is a schematic view of a state of tilting the front face portion against the main body of the in-vehicle apparatus to expose a CD insertion/ejection slot.

FIG. 3 shows a state of tilting the front face portion 120 against the in-vehicle apparatus main body 110 to expose a CD insertion/ejection slot 180. By driving a slider 181 shown in FIG. 3 with a drive mechanism, not shown, the front face portion 120 can be tilted (displaced) against the in-vehicle apparatus main body 110. By the tilting operation, the CD insertion/ejection slot 180 provided in the in-vehicle apparatus main body 110 is exposed, so a CD can be inserted or ejected. There is provided an operation button (a tilt/eject button 132*a* shown in FIG. 6), at the front face portion 120 of the in-vehicle apparatus 100, and a tilt angle can be set according to the operation of the button.

Figure 4:
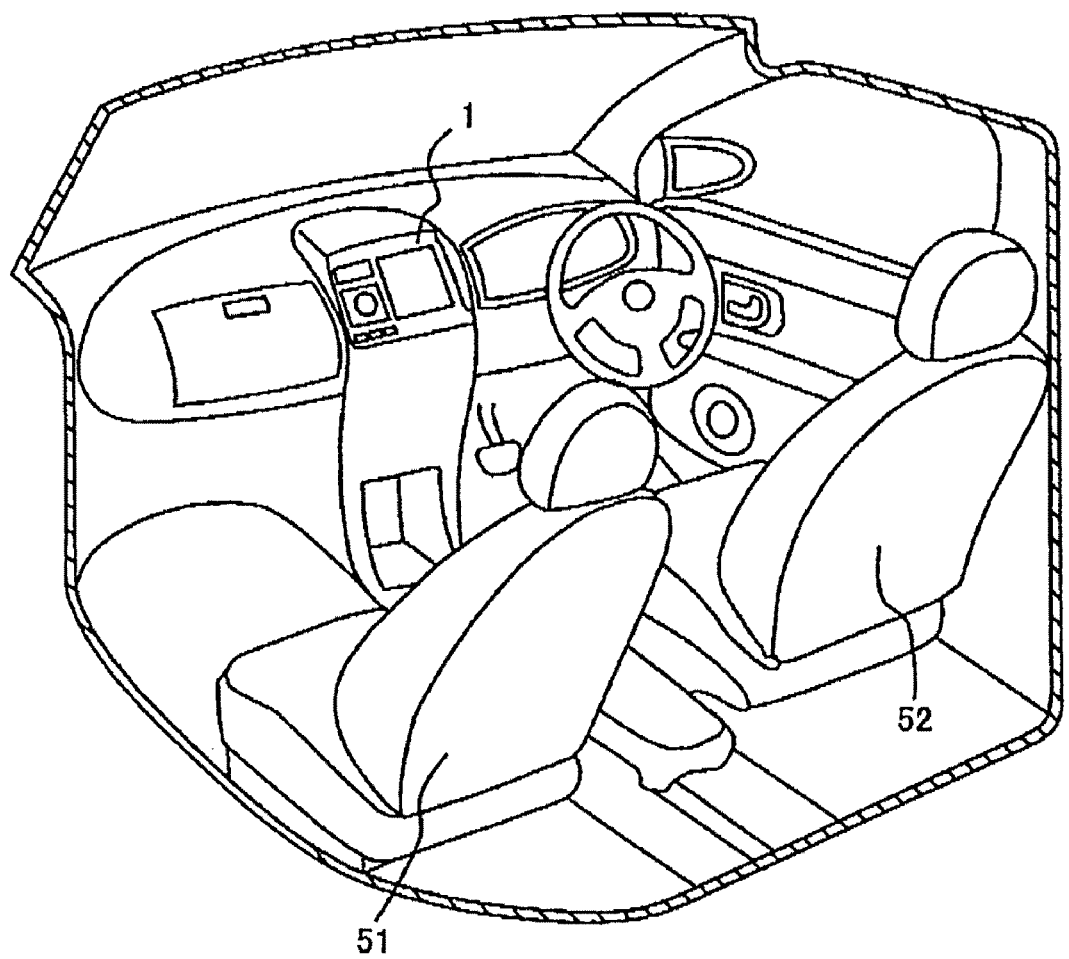
FIG. 4 is a schematic view of an example of mounting the in-vehicle system in a vehicle.

FIG. 4 illustrates an example of mounting the in-vehicle system 1, as an electronic system, in a vehicle. The in-vehicle system 1 is disposed in a dashboard portion substantially in the middle of a front-passenger's seat 51 and a driver's seat 52, as shown in FIG. 4, for example. Here, a GPS (Global Positioning System) antenna, not shown, of a GPS information receiver 133 is located on the dashboard or attached at the inner side of the front glass.

Figure 5:
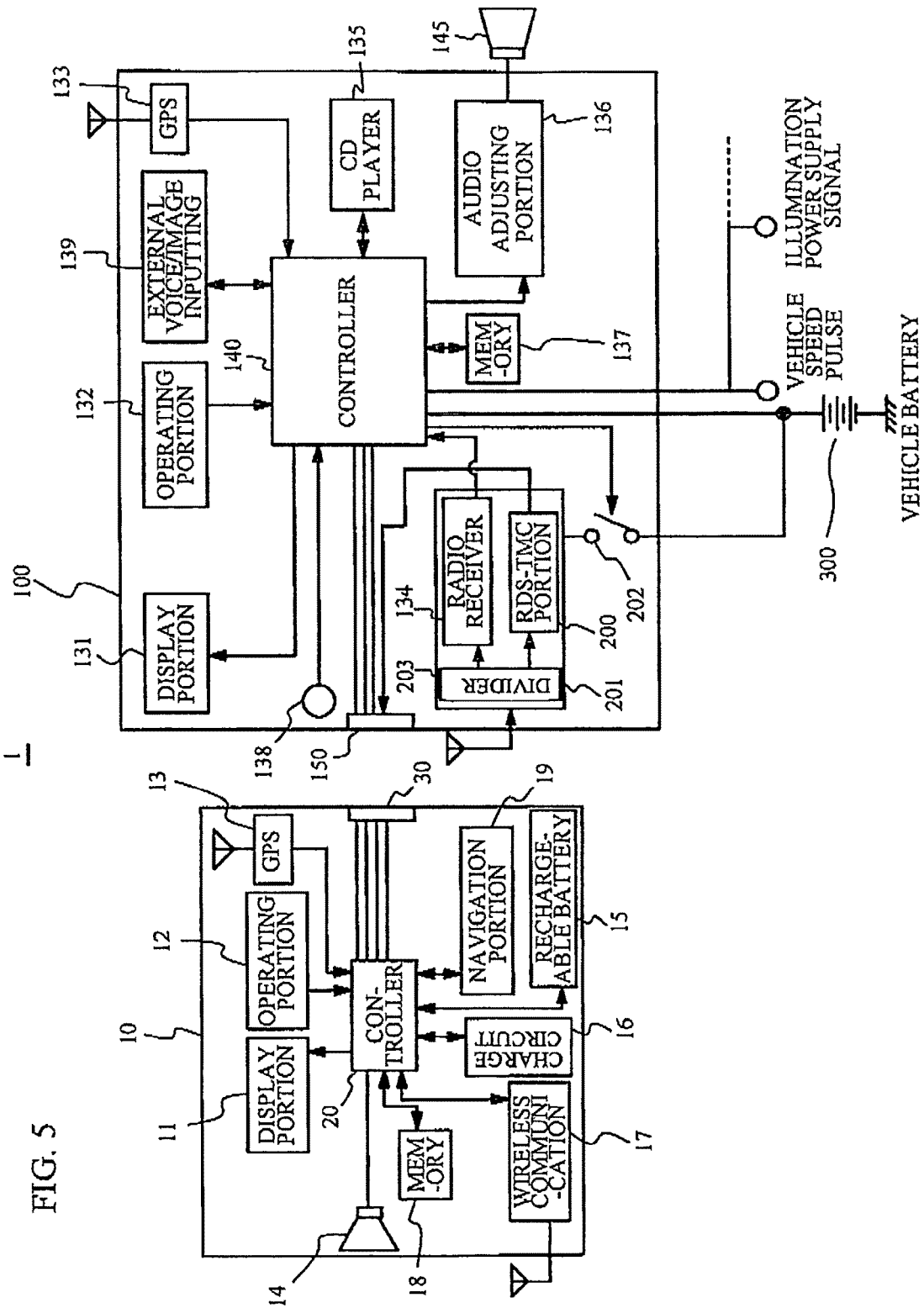
FIG. 5 is a block diagram of a schematic configuration of the in-vehicle system.

FIG. 5 is a block diagram showing a schematic configuration of the in-vehicle system 1. The in-vehicle apparatus 100 and the portable apparatus 10 are electrically connected by connectors. The connector 150 is provided at the in-vehicle apparatus 100 side, and a connector 30 (portable apparatus side connector) is provided at the portable apparatus 10. By connecting the connectors 150 and 30, various signals are sent and received between the in-vehicle apparatus 100 and the portable apparatus 10 to function as the in-vehicle system 1. The connectors 150 and 30 are respectively provided with power supply terminals for supplying power to the portable apparatus 10 from the battery 300 (power supplying portion) of the vehicle. When the portable apparatus 10 is connected to the in-vehicle apparatus 100 and the power is supplied to the in-vehicle apparatus 100, the power is also supplied to the portable apparatus 10 via the power supply terminals.

The in-vehicle apparatus 100 is provided with: the display portion 131; the operating portion 132; the GPS information receiver 133; a radio receiver 134; a CD player 135; an audio adjusting portion 136; a memory 137; a microphone 138; an external voice/image inputting portion 139; a controller 140; the connector 150; and a tuner portion 201. The in-vehicle apparatus 100 is activated by supplying the power from the battery of the vehicle, when the engine key is positioned at Acc or IG.

Figure 6:
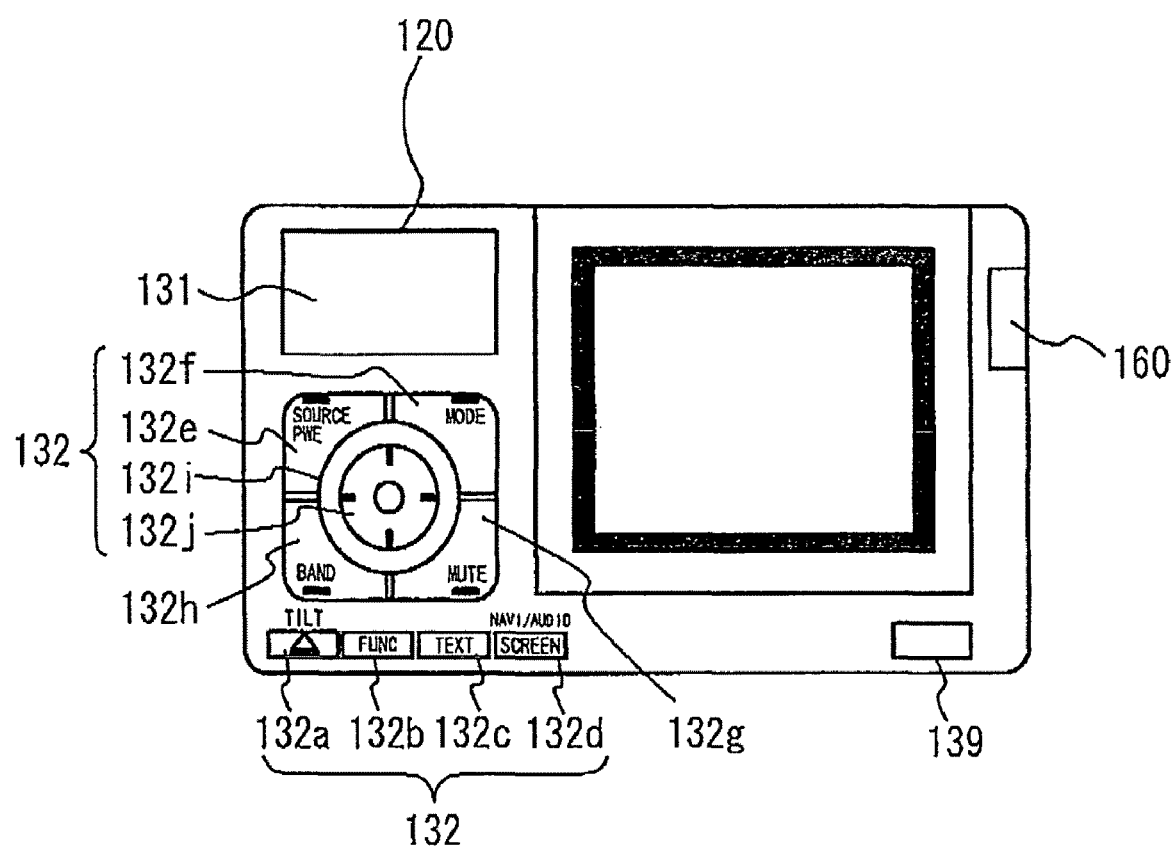
FIG. 6 is a front view of a main body.

Hereinafter, the function of each part will be described in detail. The display portion 131 is provided with a liquid crystal panel and a backlight, and displays a received broadcasting frequency, a track number of music being played, a music name being played, and the like, according to the 13-segment display. The operating portion 132 is provided for selectively changing the operation mode of the in-vehicle apparatus 100, and for operation in various modes that have been changed. The operating portion 132 is provided with a group of buttons including: the tilt/eject button 132a; a function (represented as FUNC in the drawing)/AF button 132b; a TEXT button 132c; a SCREEN button 132d; a SOURCE/PWR button 132e; a MODE button 132f; a MOTE button 132g; a BAND change button 132h; a rotary button 132i; a cross key/enter key button 132j, as shown in FIG. 6.

Here, a description will be given of switching the display between the portable apparatus 10 and the in-vehicle apparatus 100. Firstly, the in-vehicle apparatus 100 turns on when the SOURCE/PWR button 132e of the in-vehicle apparatus 100 is pushed. When the SOURCE/PWR button 132e is pushed for a short period of time while the portable apparatus 10 is on, the source is changed to the CD playing or radio broadcasting. At this time, the information on the selected source is displayed on the display portion 131 of the in-vehicle apparatus 100, and the navigation image is displayed on a display portion 11 of the portable apparatus 10, without relation to the source. Next, when the SCREEN button 132d is pushed, the navigation image displayed on the display portion 11 of the portable apparatus 10 can be changed to an image corresponding to the source selected at the in-vehicle apparatus 100.

FIG. 7A shows a state where the portable apparatus 10 is attached to the in-vehicle apparatus 100 while the CD is being played and a navigation image is being displayed on the portable apparatus 10. When the SOURCE/PWR button 132e is pushed in the state of FIG. 7A and the source is changed from the CD playing to the radio broadcasting, the information on the radio source is displayed on the display portion 131, as shown in FIG. 7B. Also, the navigation image remains being displayed on the display portion 11 of the portable apparatus 10. Then, when a user pushes the SCREEN button 132d, the image corresponding to the source being processed by the in-vehicle apparatus 100 is displayed on the display portion 11 of the portable apparatus 10, as shown in FIG. 7C (radio image is displayed in FIG. 7C). A touch panel, described later, is provided in the display portion 11 of the portable apparatus 10. A user is capable of operating the source currently being processed, by selecting the operation buttons displayed on the display portion 11.

In addition, when the SCREEN button 132d is pushed with the radio screen being displayed on the display portion 11, it is possible to return to the navigation image from the radio image, as shown in FIG. 7D. When the portable apparatus 10 is removed from the in-vehicle apparatus 100, the operation of the SCREEN button 132d is invalid. Furthermore, when a USB (Universal Serial Bus) or the like is connected to the external voice/image inputting portion 139 with the portable apparatus 10 removed from the in-vehicle apparatus 100, it is possible to prevent the change to the USB source, even if the SOURCE/PWR button 132e is pushed.

Next, a description will be given of operations of the front face portion 120 by the tilt/eject button 132a. When the tilt/eject button 132a is operated in a first manner (for example, short pressing), the front face portion 120 tilts at an angle (for example, 60 degrees) to expose the CD insertion/ejection slot 180. When the tilt/eject button 132a is operated in a second manner (for example, long pressing), the front face portion 120 tilts by a given angle (for example, five degrees) every time.

Referring back to FIG. 5, the GPS information receiver 133 includes a GPS antenna and a tuner, and receives GPS signals from a satellite. The GPS signal received by the GPS information receiver 133 is output through the controller 140, the connector 150, the connector 30, and a controller 20, to a navigation portion 19 of the portable apparatus 10, and then the position of the vehicle in which the in-vehicle apparatus 100 having the portable apparatus 10 therein is determined based on the GPS signal. Herein, the GPS signal may be output to the navigation portion of the portable apparatus 10 through the controller 140, instead of through the controller 20. Alternatively, the GPS information receiver 133 may be composed of the GPS antenna only, so that the GPS signal received by the GPS antenna may be output to the tuner of a GPS information receiver 13, described later, without through the controller 140 or the controller 20. Further alternatively, the GPS signal received by a GPS antenna may be output through the controller 20 to the tuner of the GPS information receiver 13 without the intervention of the controller 140. Various changes may be made as necessary.

The turner portion 201 includes a divider 203, a radio receiver 134, and an RDS-TMC portion 200. The divider 203 divides multiple pieces of information, which are received by the antenna, into radio information and TMC information, and then transmits the radio information to the radio receiver 134 and the TMC information to the RDS-TMC portion 200. The radio receiver 134 has a tuner, receives broadcast waves such as AM broadcasting, FM broadcasting, and sound multiplex broadcasting, outputs stereo audio signals, receives and demodulates multiplex data, and outputs the demodulated signal to the controller 140. The CD player 135 reproduces the data stored in the CD, and outputs the reproduced signal to the controller 140. Herein, the demodulated signal output from the radio receiver 134 may be output to the audio adjusting portion 136, described later, without the intervention of the controller 140. The RDS-TMC portion 200 provides traffic information to the controller 20 of the portable apparatus 10. A power switch 202 is provided between the RDS-TMC portion 200 and the in-vehicle battery.

The audio adjusting portion 136 implements signal processing such as volume control or tone control on an audio signal received or demodulated by the radio receiver 134 or on the audio signal reproduced by the CD player 135, and then outputs the processed signal to a speaker 145. The memory 137 may be composed of a RAM (Random Access Memory) from which data is readable and into which data is writable, and temporarily stores information necessary for control. The microphone 138 is provided for hands-free communication, and takes in user's voices in the vehicle. The external voice/image inputting portion 139 is provided with a connection terminal with an external device such as a USB memory, portable audio device, or the like so that an audio signal or data from the external device may be input. The external voice/image inputting portion 139 then sends the signal or data to the controller 140, and outputs the audio signal, data, or the like to the external device connected.

The controller 140 controls the radio receiver 134, the CD player 135, and the audio adjusting portion 136, according to the operation by means of the operating portion 132. Also, the controller 140 outputs various signals through the connector 150 to the portable apparatus 10, and controls the in-vehicle apparatus 100 on the basis of the various signals input from the portable apparatus 10. For example, the controller 140 outputs the GPS signal received by the GPS information receiver 133 or the audio signal input through the microphone 138, to the portable apparatus 10 by way of the connector 150. Here, the audio signal input through the microphone 138 may be output to the portable apparatus 10 by way of the connector 150, without through the controller 140. In addition, the voice in communication over a mobile phone connected to the portable apparatus 10 is input through the connector 150 into the controller 140, and is then output through the audio adjusting portion 136 to the speaker 145. Furthermore, the controller 140 acquires an operation signal corresponding to a menu image of various modes displayed on the display portion 11 of the portable apparatus 10, from the controller 20 of the portable apparatus 10, and then controls the radio receiver 134 and the CD player 135.

Also, the power is supplied to the controller 140 from the in-vehicle battery 300. When the portable apparatus 10 is connected, the controller 140 outputs the power supplied from the in-vehicle battery 300 to the portable apparatus 10. Here, a vehicle speed pulse and an illumination power supply signal are input into the controller 140 from a vehicle. The controller 140 transfers such input vehicle speed pulse to the controller 20 of the portable apparatus 10. Meanwhile, the vehicle speed pulse may be configured not to be input into the in-vehicle apparatus 100.

Next, a description will be given of the portable apparatus 10. The portable apparatus 10 is provided with: the display portion 11; an operating portion 12; the GPS information receiver 13; a speaker 14; a rechargeable battery 15; a charge circuit 16; a wireless communication transmitter/receiver 17; a memory 18; the navigation portion 19; the controller 20; and the connector 30.

Hereinafter, functions of the components will be described in detail. The display portion 11 is provided with a liquid crystal panel and a backlight, and is capable of displaying map information generated by the navigation portion 19 and guiding path information to a destination, the received broadcasting frequency transferred from the in-vehicle apparatus 100, a music track number played, a music name played, and the like. Here, the display portions 11 and 131 may employ a flat panel display other than a liquid crystal panel. Examples are organic light emitting display, plasma display panel, cold-cathode flat panel display, or the like.

The operating portion 12 includes a power button 55 for powering on or off the touch panel or the portable apparatus 10. The touch panel is, for example, disposed on the display screen. When the touch panel is touched by a finger or a dedicated pen, the touched position is detected to determine whether or not there is an input operation. The power button 55 will be described later in detail.

The GPS information receiver 13 includes an antenna and a tuner, and receives the GPS signal from a satellite. Such received GPS signal is output to the navigation portion 19, and the vehicle location is detected based on the GPS signal. Meanwhile, the in-vehicle apparatus 100 is also provided with the GPS information receiver 133. However, when the portable apparatus 10 is attached to the in-vehicle apparatus 100, the location of the vehicle, in which the in-vehicle apparatus 100 having the portable apparatus 10 is mounted, is specified by use of the GPS signal (and the vehicle speed pulse) received by the GPS information receiver 133. When the portable apparatus 10 is used alone, the location thereof is specified by use of the GPS signal received by the GPS information receiver 13.

The speaker 14 is provided for outputting the audio information of the navigation portion 19, and outputs the audio information only when the portable apparatus 10 is detached from the in-vehicle apparatus 100, namely, used alone separately.

The rechargeable battery 15 supplies power to each portion of the portable apparatus 10, when the portable apparatus 10 is detached from the in-vehicle apparatus 100. When the portable apparatus 10 is attached to the in-vehicle apparatus 100, the power is supplied through the power supply terminals of the connector 30 from the in-vehicle battery 300 and the rechargeable battery 15 is charged by the charge circuit 16. Also, the charge circuit 16 is supplied with the power from the connection terminal through a USB slot (see FIG. 8A), so that the rechargeable battery 15 can be charged.

The wireless communication transmitter/receiver 17 sends and receives the voice in communication over a mobile phone, and acquires the information used for navigation over the mobile phone. For example, Bluetooth, which is a wireless transmission system at 2.4 GHz band, is used for the wireless communication transmitter/receiver 17.

The memory 18 may be a RAM from which data is readable and into which the data is writable, and temporarily stores the information read for each control.

The navigation portion 19 includes a map information storing portion that acquires from an SD (Secure Digital) card or a USB memory, described later, and stores the map information used for navigation, determines current location information with GPS signal from the GPS information receiver 133 or the GPS information receiver 13, and creates a map image for navigation. The created map image can be displayed on the display portion 11. In addition, when the in-vehicle apparatus 100 and the portable apparatus 10 are connected, the vehicle speed pulse is acquired from the vehicle so that the accuracy of the location detection of the vehicle can be improved. Optionally, the map information may be retained in the portable apparatus 10.

The controller 20 controls each part of the portable apparatus 10. Also, the controller 20 outputs various signals to the in-vehicle apparatus 100 through the connector 30, and controls the portable apparatus 10 based on the various signals input from the in-vehicle apparatus 100. For example, the controller 20 acquires the GPS signal received by the GPS information receiver 133 of the in-vehicle apparatus 100 and the vehicle speed pulse, and outputs to the navigation portion 19. Also, the controller 20 acquires the audio signal input by the microphone 138 of the in-vehicle apparatus 100 from the controller 140 of the in-vehicle apparatus 100, and controls the navigation portion 19 according to the audio signal acquired. That is to say, the navigation portion 19 can be operated in a hands-free manner. The voice on communication over the mobile phone connected to the wireless communication transmitter/receiver 17 is output to an in-vehicle apparatus side through the connector 30, and is caused to output from the speaker 145 of the in-vehicle apparatus 100. The operation signal on the menu screen or content screen displayed on the display portion 11 is output to the controller 140 of the in-vehicle apparatus 100 through the connector 30. The controller 140 controls the radio receiver 134 or the CD player 135 according to the operation signal transmitted from the controller 20 of the portable apparatus 10.

Figure 8A:
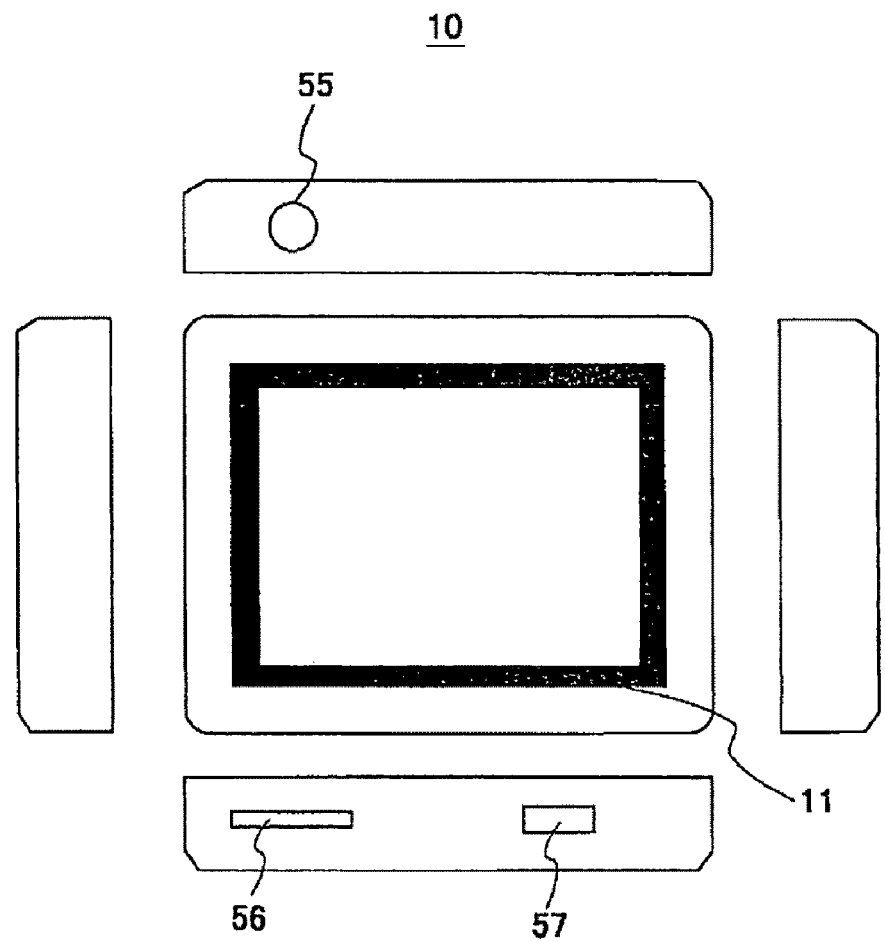
FIG. 8A is a schematic view of a front view, top view, bottom view, left-side view, and right-side view of the portable apparatus.
Figure 8B:
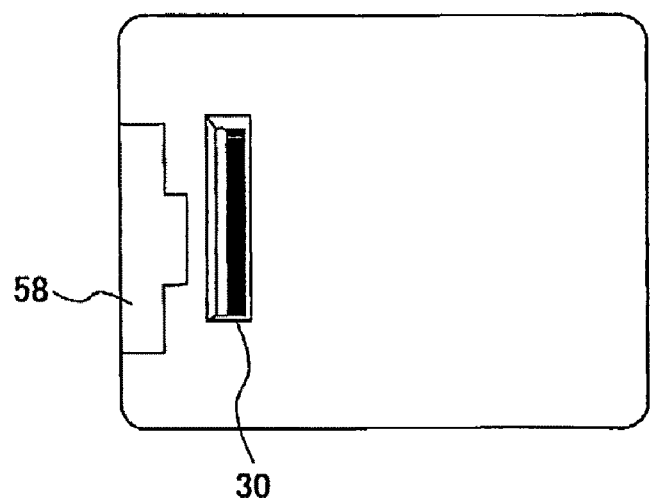
FIG. 8B is a back view of the portable apparatus.

FIG. 8A shows a front view, top view, bottom view, left-side view, and right-side view of the portable apparatus 10. FIG. 8B is a back view of the portable apparatus 10. The top face of the portable apparatus 10 is provided with the power button 55 for turning on or off the power of the portable apparatus. The bottom face of the portable apparatus 10 is provided with: an SD (Secure Digital) memory card slot 56; and the USB slot 57. By inserting the SD card or the USB memory storing the map information into the slots, the controller 20 reads the map information from the SD card or the USB memory and outputs the map information to the navigation portion 19.

The power of the portable apparatus 10 is turned on or off by the control of the in-vehicle apparatus 100, when the portable apparatus is attached to the in-vehicle apparatus 100. In addition, when the portable apparatus 10 is removed from the in-vehicle apparatus 100 and used alone, the power is operated on the basis of the on and off operations of the power button 55.

At a backside of the portable apparatus 10, there are provided: the connector 30 electrically connected with the in-vehicle apparatus 100; and an engagement portion 58 to be engaged with a lock mechanism (not shown) provided at the in-vehicle apparatus 100 side.

Figure 9:
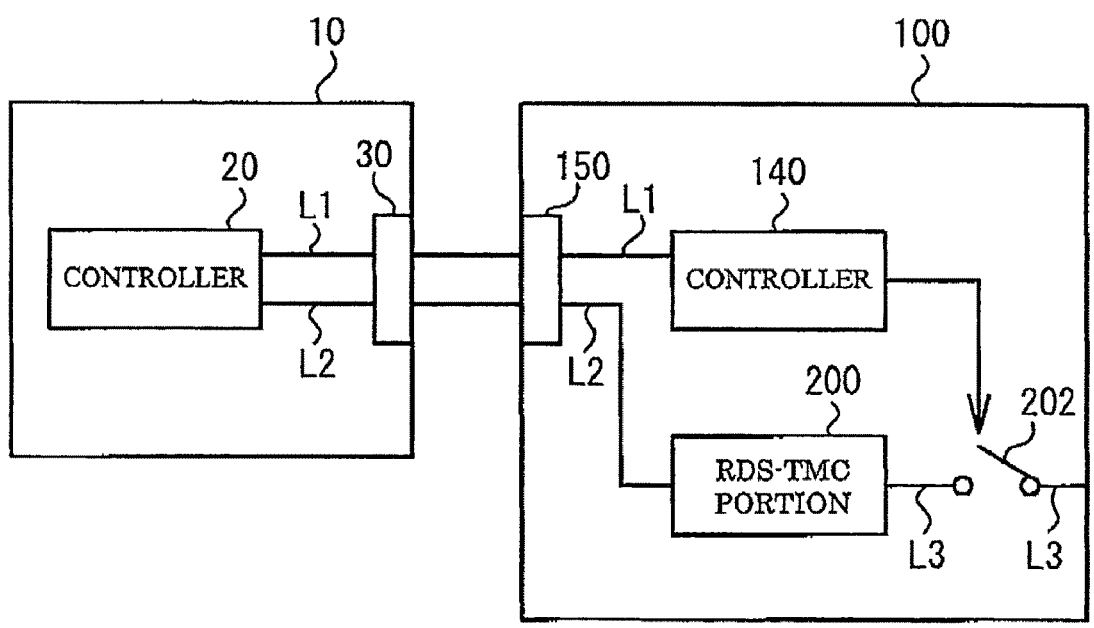
FIG. 9 is a block view mainly illustrating of an RDS-TMC portion of the in-vehicle apparatus.

FIG. 9 is a block view of the portable apparatus 10 and the in-vehicle apparatus 100, and illustrates the RDS-TMC portion 200 without common configurations illustrated in FIG. 5. Referring to FIG. 9, the controller 20 of the portable apparatus 10 and the controller 140 of the in-vehicle apparatus 100 transmit and receive control information through a first communication line L1. The control information is signals for controlling each unit installed in the portable apparatus 10 and the in-vehicle apparatus 100. As illustrated in FIG. 5, the in-vehicle apparatus 100 controls each unit (for example, the navigation portion 19, the operating portion 12 or the like) of the portable apparatus 10 through the controller 20. Likewise, the portable apparatus 10 controls each unit (for example, the operating portion 132 or the radio receiver 134) of the in-vehicle apparatus 100 through the controller 140.

Referring to FIG. 9, the RDS-TMC portion 200 (information providing portion) provides the traffic information, which is received as an FM radio medium, to the controller 20 through a communication line L2. The communication line L2, which is separate from the communication line L1, connects the portable apparatus 10 and the in-vehicle apparatus 100 through connectors 30 and 150. The power switch 202 is provided on a power line L3 of the RDS-TMC portion 200. The power switch 202 turns off power supplied to the RDS-TMC portion 200 from the in-vehicle battery 300 and turns on power again, on the basis of the control of the controller 140. Additionally, the RDS-TMC portion 200 may be provided within the controller 140. Additionally, the RDS-TMC portion 200 includes IC modules. Further, the RDS-TMC portion 200 may be provided within the controller 140.

Figure 10:
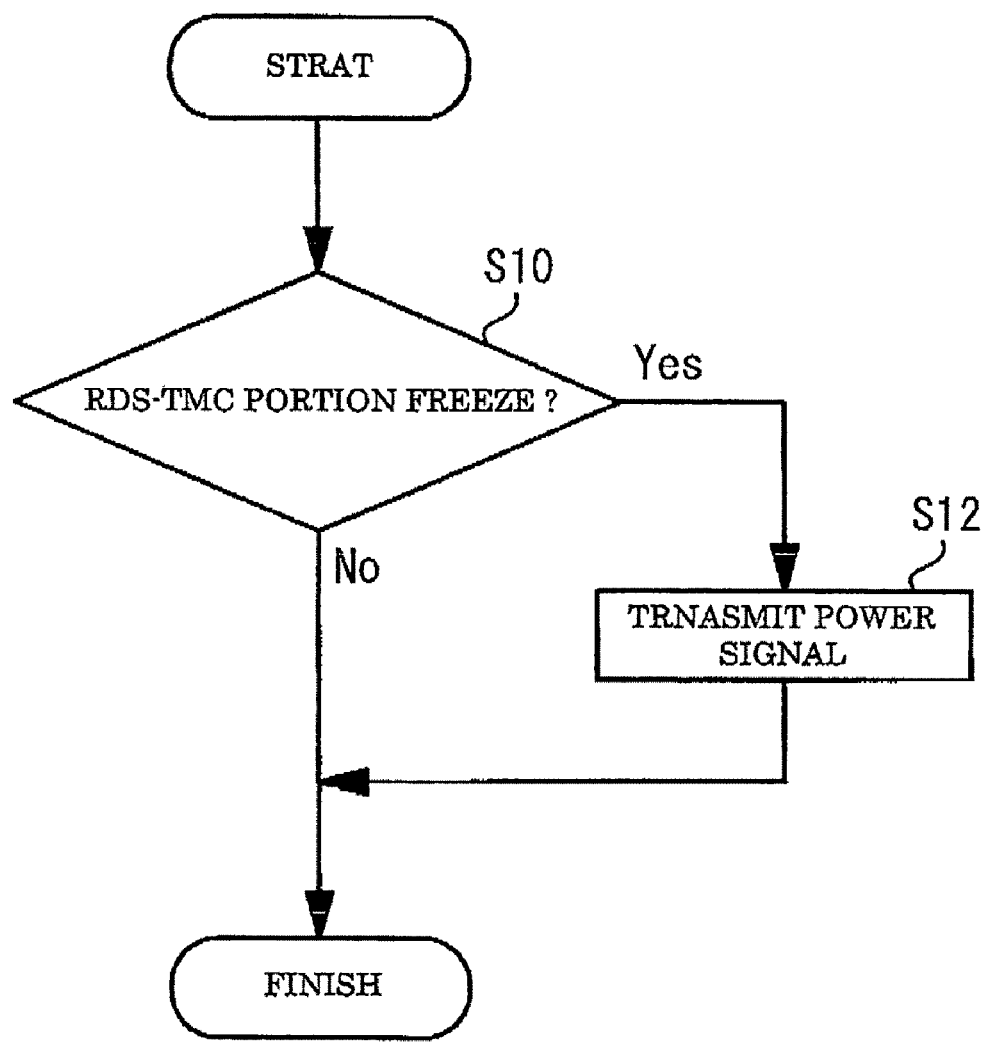
FIG. 10 is a flowchart of operations of a controller of the portable apparatus.
Figure 11:
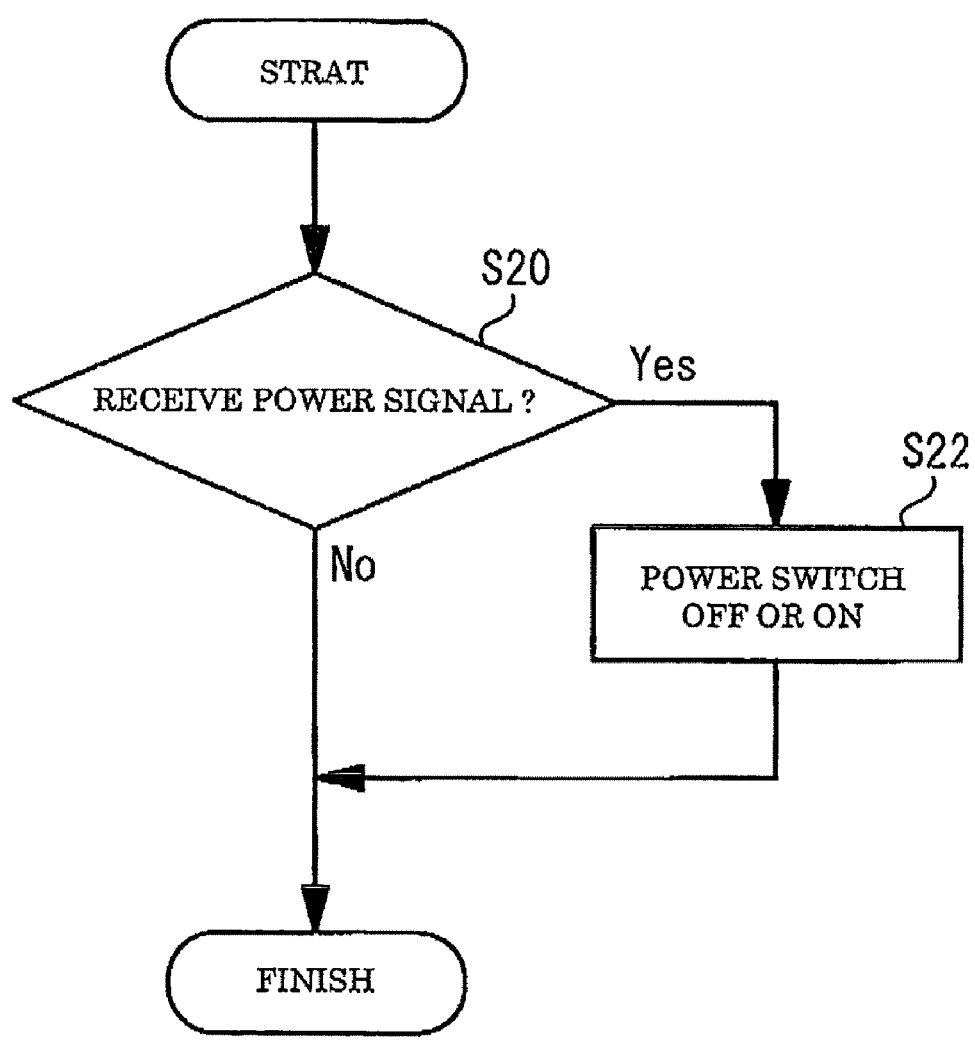
FIG. 11 is a flowchart of operations of a controller of the in-vehicle apparatus.
Figure 12A:
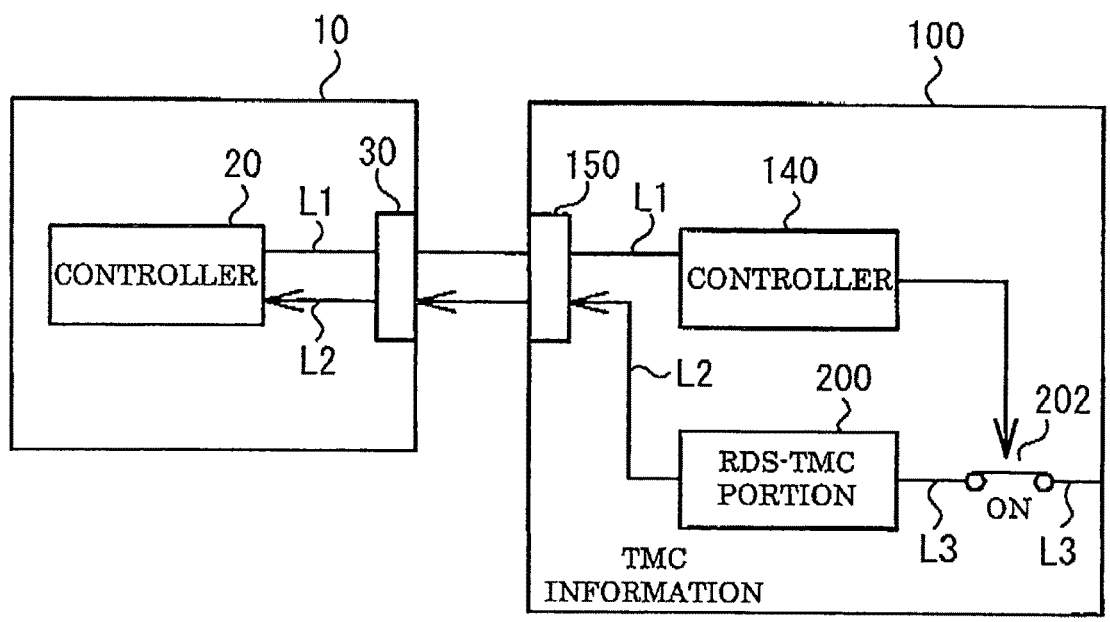
FIGS. 12A and 12B are views of transmission and reception of information.
Figure 12B:
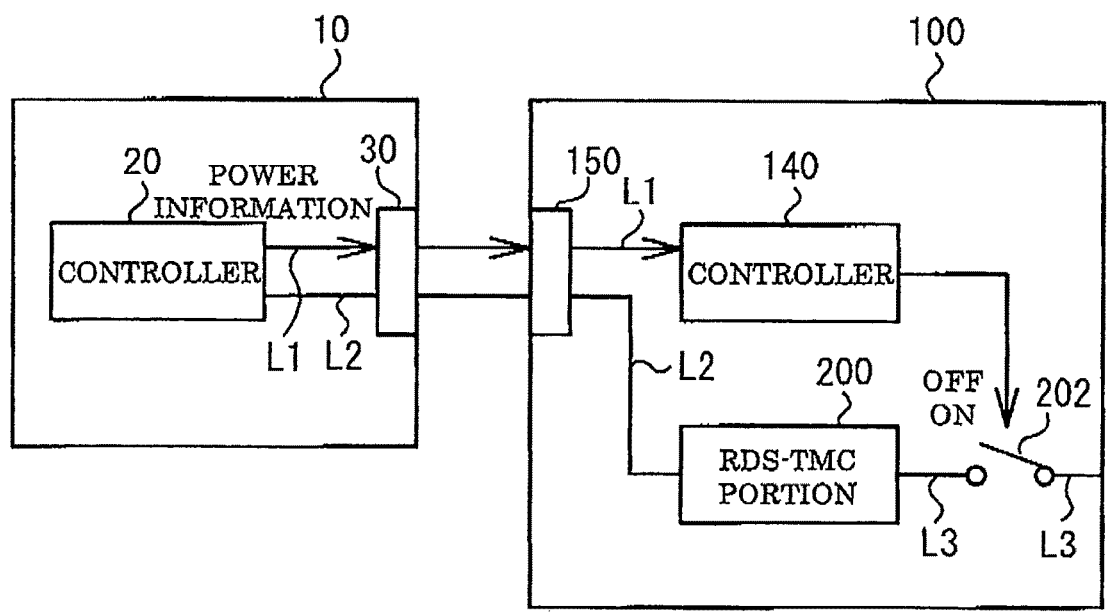

A description will be given of the control of the in-vehicle system 1 with reference to FIGS. 10, 11, 12A and 12B. FIG. 10 is a flowchart showing the control of the controller 20 in the portable apparatus 10. FIG. 11 is a flowchart showing the control of the controller 140 in the in-vehicle apparatus 100. FIGS. 12A and 12B show transmission and reception of signals of each unit.

Referring to FIG. 12A, the power switch 202 is turned on, and the RDS-TMC portion 200 is connected with the power line L3. The RDS-TMC portion 200 provides TMC information to the controller 20 through the communication line L2 on the basis of information request signals transmitted from the controller 20 of the portable apparatus 10. The TMC information is traffic information received by the RDS-TMC portion 200. The traffic information includes traffic jam information or the like. As illustrated in FIG. 10, the controller 20 of the portable apparatus 10 determines whether the RDS-TMC portion 200 freezes (step S10).

For example, the controller 20 transmits verification signals, which verify whether the RDS-TMC portion 200 normally operates, to the RDS-TMC portion 200 through the second communication line. When the RDS-TMC portion 200 normally operates, the RDS-TMC portion 200 transmits operation signals, which indicate that the RDS-TMC portion 200 normally operates, to the controller 20 through the communication line L2. On the other hand, when the RDS-TMC portion 200 freezes (function stop), the RDS-TMC portion 200 dose not transmit the operation signals to the controller 20. Thus, when the controller 20 transmits the verification signals to the RDS-TMC portion 200 and does not receive the operation signals within a given period, the controller 20 determines that the RDS-TMC portion 200 freezes.

When No is determined in step S10, the processing is finished, and the controller 20 continually communicates the RDS-TMC portion 200. When Yes is determined in step S10, referring to FIG. 12B, the controller 20 transmits power signals to the controller 140 of the in-vehicle apparatus 100 through the communication line L1 (step S12). The power signals are signals for restarting the RDS-TMC portion 200, and are information for turning off the RDS-TMC portion 200 and then supplying power again in the first embodiment.

Referring to FIG. 11, the controller 140 of the in-vehicle apparatus 100 determines whether the power signals are received from the controller 20 of the portable apparatus 10 (step S20). When No is determined in step S20, the processing is finished and then returns to step S20. When Yes is determined in step S20, the controller 140 turns off the power switch 202 and turns on the power switch 202 again as illustrated in FIG. 12B (step S22). Accordingly, the RDS-TMC portion 200 is restarted.

In the first embodiment, the RDS-TMC portion 200 is provided in the in-vehicle apparatus 100, and the information, which is input to and output from the RDS-TMC portion 200, is transmitted to and received from the controller 20 of the portable apparatus 10 through the communication line L2. Thus, the controller 20 of the portable apparatus 10 is able to determine that the RDS-TMC portion 200 freezes. Hence, when the controller 20 restarts the RDS-TMC portion 200, the controller 20 controls the restarting of the RDS-TMC portion 200 through another communication line other than the communication line L2. However, in order to reduce the cost, it is preferable that the number of the pins provided in the connectors 30 and 150 be small. Therefore, the controller 20 transmits the power signals to the controller 140 by using the communication line L1, through which the controllers 20 and 140 transmit and receive the control signals from each other, in step S12 as illustrated in FIG. 10. The controller 140 restarts the RDS-TMC portion 200 based on the power signals. That is to say, when the controller 140 receives the signals, which indicate that the function of the RDS-TMC portion 200 stops, from the portable apparatus 10 through the communication line L1, the controller 140 controls the restarting of the RDS-TMC portion 200. Accordingly, the RDS-TMC portion 200 can be restarted without adding another communication line other then the first and second communication lines L1 and L2.

Further, by turning off power to the RDS-TMC portion 200 from the power supplying portion such as the in-vehicle battery 300 and turning on power again, the RDS-TMC portion 200 can be restarted. This restarts the RDS-TMC portion 200 with ease. Additionally, the restart means that the RDS-TMC portion 200 whose function is stopped is restarted again.

The information providing portion may be a VICS portion, which provides VICS information to the portable apparatus 10, or may be a receiver, which receives information of satellite radio, in addition to the RDS-TMC portion 200. Accordingly, the information providing portion is made to serve as a unit that provides the traffic information to the portable apparatus 10 serving as a navigation apparatus. Moreover, the information, which is provided to the portable apparatus 10 by the information providing portion, may be any other information. In this manner, the information providing portion may be any unit provided in the in-vehicle apparatus 100 as far as it provides the information to the portable apparatus 10 through another line separate from the communication line L1.

Further, the in-vehicle apparatus 100 includes the power switch 202, which turns off power supplied to the RDS-TMC portion 200 from the in-vehicle battery 300 and turns on power, as illustrated in FIG. 9. When the controller 140 receives the power signals, the controller 140 controls the power switch 202. The power switch 202 turns off power supplied from the in-vehicle battery to the RDS-TMC portion 200, and then allows the power to be supplied again. This allows the RDS-TMC portion 200 to be turned off and turned on with ease. Additionally, the power supplying portion may be a battery installed in the in-vehicle apparatus 100.

The first embodiment has been described the portable apparatus 10 of the navigation apparatus as a portable apparatus, the portable apparatus may be any electronic apparatus other than the navigation apparatus. Additionally, the navigation apparatus is an electronic apparatus where the position of the vehicle itself is displayed on map information and a user is navigated to the destination set by the user. Further, although the electronic apparatus has been described as the in-vehicle apparatus, the electronic apparatus may be any electronic apparatus, such as a home electronic apparatus, other than the in-vehicle apparatus.

Although the CD player 135 is provided in the in-vehicle apparatus 100 as illustrated in FIG. 5, an optical disk storage medium player may be provided with a CD player, a DVD player, a Blu-ray player, or a HD-DVD. When the in-vehicle apparatus 100 is provided with the DVD player, the portable apparatus 10 may be replay moving images information of the DVD.

The portable apparatus 10 may be have a one-segment TV tuner, and the in-vehicle apparatus 100 may be have a full-segment TVC tuner. In this case, the one-segment TV tuner or the full-segment TVC tuner can be selectively used, when the in-vehicle apparatus 100 is attached with the portable apparatus 10. Alternatively, the full-segment TVC tuner may be automatically selected.

Further, in the in-vehicle apparatus 100 according to the first embodiment as illustrated in FIG. 5, a road information receiver, which receives road information such as the VICS information, is omitted. However, the in-vehicle apparatus 100 has the road information receiver in actuality.

The portable apparatus 10 may have a map data storage portion composed of a nonvolatile memory such as a flash memory, a compact hard disk having a 1.8 inch size, or the like. Further, each of them may be composed of a detachable IC memory card (a SD card, a mini SD, a memory stick, a compact flash (registered trademark) or the like), or a card type HDD (microdrive).

While the exemplary embodiments of the present invention have been illustrated in detail, the present invention is not limited to the above-mentioned embodiments, and other embodiments, variations and modifications may be made without departing from the scope of the present invention.

The invention claimed is:

1. An electronic apparatus, from which a portable apparatus is detachable, and which includes an information providing portion for providing information to the portable apparatus, the electronic apparatus comprising:
   a controller which transmits to and receives from the portable apparatus control information through a first communication line, and which controls restarting of the information providing portion when the controller receives from the portable apparatus a signal indicating that a function of the information providing portion stops,
   wherein the information providing portion does not provide information to the controller and provides information to the portable apparatus.

2. The electronic apparatus of claim 1, wherein the information providing portion provides information to the portable apparatus through a second communication line,
   and the controller transmits to and receives from the portable apparatus control information through the first communication line separate from the second communication line, and controls restarting of the information providing portion when the controller receives from the portable apparatus a signal indicating that a function of the information providing portion stops.

3. The electronic apparatus of claim 1, wherein the controller controls restarting of the information providing portion by turning off power supplied to the information providing portion from a power supplying portion and by turning on the power again when the controller receives from the portable apparatus the signal indicating that the function of the information providing portion stops.

4. The electronic apparatus of claim 1, further comprising a power switch which turns off power supplied to the information providing portion from the power supplying portion,
   the controller controlling the power switch when the controller receives from the apparatus the signal indicating that the function of the information providing portion stops, and
   the power switch turning off power supplied to the information providing portion from the power supplying portion based on control of the controller and supplying the power again.

5. The electronic apparatus of claim 1, wherein:
the portable apparatus is a navigation apparatus; and
the information providing portion provides traffic information to the portable apparatus.

6. The electronic apparatus of claim 1 wherein the electronic apparatus is an in-vehicle apparatus.

7. An electronic system including a portable apparatus and an electronic apparatus from which the portable apparatus is detachable and which includes an information providing portion for providing information to the portable apparatus, wherein:
the portable apparatus determines whether a function of the information providing portion stops, and transmits a signal indicating that the function of the information providing portion stops through a first communication line when the portable apparatus determines that the function of the information providing portion stops;
the electronic apparatus includes a controller which transmits to and receives from the portable apparatus control information through the first communication line, and which controls restarting of the information providing portion when the controller receives from the portable apparatus the signal indicating that the function of the information providing portion stops; and
the information providing portion does not provide information to the controller and provides information to the portable apparatus.

8. The electronic system of claim 7, wherein the electronic apparatus includes a controller which transmits to and receives from the portable apparatus control information through the first communication line separate from a second communication line, and which controls restarting of the information providing portion when the controller receives from the portable apparatus the signal indicating that the function of the information providing portion stops.

* * * * *